United States Patent [19]

Lissant

[11] 3,988,508

[45] Oct. 26, 1976

[54] HIGH INTERNAL PHASE RATIO EMULSION POLYMERS

[75] Inventor: Kenneth J. Lissant, St. Louis, Mo.

[73] Assignee: Petrolite Corporation, St. Louis, Mo.

[22] Filed: Mar. 8, 1973

[21] Appl. No.: 339,203

[52] U.S. Cl. .................. 526/344; 260/29.6 R; 260/29.6 AQ; 260/29.6 WQ; 526/345; 526/346; 526/347; 526/909; 526/911

[51] Int. Cl.$^2$ ............ C08F 2/30; C08F 14/06; C08F 12/08

[58] Field of Search ........ 260/92.8 W, 89.1, 88.2 B, 260/89.5 AW, 95 R, 93.5 W, 93.5 S, 29.6 R, 29.6 AQ, 29.6 WQ, 80 M; 526/344, 345, 346, 347, 909, 911

[56] References Cited
UNITED STATES PATENTS

| | | | |
|---|---|---|---|
| 3,206,441 | 9/1965 | Bonin et al. | 260/78.5 |
| 3,255,127 | 6/1966 | Bonin et al. | 260/2.5 |
| 3,352,109 | 11/1967 | Lissant | 60/217 |
| 3,565,817 | 2/1971 | Lissant | 252/312 |
| 3,687,923 | 8/1972 | Thomas et al. | 260/92.8 R |

FOREIGN PATENTS OR APPLICATIONS

| | | | |
|---|---|---|---|
| 62,453 | 6/1968 | Germany | 260/92.8 W |
| 6,904,788 | 2/1969 | Japan | 260/92.8 W |

OTHER PUBLICATIONS

Hydrocarbon Processing, Nov. 1968, vol. 47, No. 11, pp. 192–196, New Improved Bulk PVC Process, Jean-Claude Thomas.

*Primary Examiner*—John Kight, III
*Attorney, Agent, or Firm*—Sidney B. Ring; Hyman F. Glass

[57] ABSTRACT

Unique polymers are prepared by the polymerization of high internal phase ratio emulsions of monomers in aqueous systems.

14 Claims, No Drawings

HIGH INTERNAL PHASE RATIO EMULSION POLYMERS

The production of polymeric materials by causing monomers to react is a well established art. In general, such polymerizations are carried out in one of two methods. The first of these processes is known as bulk polymerization. In this method, the monomer is mixed with a suitable catalyst system and allowed to react. As the polymerization proceeds, the viscosity of the mixture increases and, if left undisturbed, a solid mass results. This procedure is quite satisfactory where it is desired to cast the polymer into some rigid form such as blocks, sheets or molded objects. However, if it is desired to obtain the polymer in a form suitable for further processing, special precautions must be taken. In general, grinding or chopping the bulk polymer is a difficult and unsatisfactory procedure. It is usually preferable to apply sufficient agitation to the polymerizing mixture so that a powder or "crumb" is obtained.

Because of the difficulty encountered in processing bulk polymerization, a second general method of conducting polymerization was developed. This method is known as emulsion polymerization. In this method, the liquid monomer is emulsified in an immiscible carrier liquid, usually water. The internal dispersed monomeric phase may constitute for example from 10 – 40% by volume of the emulsion.

Emulsion polymerization has the advantage that it allows one to process a liquid mixture even when the polymer system has proceeded to the point where solid polymer is produced. The high heat capacity of water also helps in controlling the temperature and in removing the heat of the reaction.

Emulsion polymerization has its drawbacks. In order to maintain low viscosity, the percent of internal phase, monomer is usually kept low. Once the polymerization is complete, the latex must be coagulated and the polymeric material recovered and washed free of contaminants. Under certain conditions, this may be as expensive as the grinding step in bulk polymerization.

If the polymer is to be used in coating formulations, dissolved in solvents, or used in plasticol formulations, it is desirable to obtain the polymer in the form of a powder with a small particle size. Optimum processing in the bulk polymerization method seldom yields particle size less than about 100 microns. Emulsion polymerization can produce extremely small particles. For example, particles in the 1 to 5 micron range. However, the difficulty in removing surface active contaminants used in the polymerization process from these extremely fine particles makes them less satisfactory.

Thus, the process of emulsion polymerization comprises forming an emulsion of monomer in an aqueous system and causing the monomer to polymerize. The end product is generally a stable latex or suspension of finely divided polymer particles. For example, vinyl monomers such as styrene, vinyl chloride, vinyl acetate, methyl methacrylate, or other monomers or mixtures of monomers are commercially polymerized by emulsion polymerization. However, all of these emulsion polymerizations are carried out in systems where the emulsion contains a low percent internal phase monomer in water generally in ratios of about 20 to 40% or less.

I have now discovered a process of emulsion polymerization which comprises forming an emulsion of monomer in an aqueous system wherein the emulsion contains a high internal phase ratio of monomer to water, i.e., greater than about 50%, such as greater than about 60%, for example from about 70%, but preferably about 85 to 95%.

The process of this invention combines the advantages of both bulk and emulsion polymerization.

The polymers formed by this process are uniquely different from those formed by the conventional emulsion process.

In practice the process of this invention is carried out by preparing a high internal phase ratio emulsion of monomer(s) in an aqueous system and causing the monomer(s) to polymerize by the addition of catalysts and/or heat or ultraviolet light to form the polymer.

When the monomer is polymerized, the polymer formed is in the shape of hollow spheres which can be crushed to produce an extremely fine powder of unique properties.

Any monomer or mixtures of monomers heretofore polymerized by emulsion polymerization can be polymerized in accordance with this invention employing the same catalysts, regulators, etc. employed for low internal phase ratio emulsions, except that the polymerization of the present invention is carried out with a high internal phase ratio emulsion. This process produces unique polymers.

In preparing the emulsion a suitable emulsifier must be employed which is capable of forming a high internal phase ratio emulsion.

The emulsifiers most usually employed in the practice of this invention are generally known as oxyalkylated surfactants or more specifically polyalkylene ether or polyoxyalkylene surfactants. Oxyalkylated surfactants as a class are well known. The possible sub-classes and specific species are legion. The methods employed for the preparation of such oxyalkylated surfactants are also too well known to require much elaboration. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, or higher oxides, epichlorohydrin, etc. However, they may be obtained by other methods such as shown in U.S. Pat. Nos. 2,588,771 and 2,596,091–3, or by esterification or amidification with an oxyalkylated material, etc. Mixtures of oxides may be used as well as successive additions of the same or different oxides may be employed. Any oxyalkylatable material may be employed. As typical starting materials may be mentioned alkyl phenols, phenolic resins, alcohols, glycols, amines, organic acids, carbohydrates, mercaptans, and partial esters of polybasic acids. In general, the art teaches that, if the starting material is water-soluble, it may be converted into an oil-soluble surfactant by the addition of polypropoxy or polybutoxy chains. If the starting material is oil-soluble, it may be converted into a water-soluble surfactant by the addition of polyethoxy chains. Subsequent additions of ethoxy units to the chains tend to increase the water-solubility, while, subsequent additions of high alkoxy chains tend to increase the oil solubility. In general, the final solubility and surfactant properties are a result of a balance between the oil-soluble portions of the molecule.

In the practice of this invention it has been found that emulsifiers suitable for the preparation of high internal phase ratio emulsions may be prepared from a wide variety of starting materials. For instance, if one begins with an oil-soluble material such as a phenol or a long chain fatty alcohol and prepare a series of products by reaction with successive portions of ethylene oxide, one finds that the members of the series are successively more water-soluble. One finds also that somewhere in the series there will be a limited range where the products are useful for the practice of this invention. Similarly it is possible to start with water or a water-soluble material such as polyethylene glycol and add, successively, portions of propylene oxide. The members of this series will be progressively less water-soluble and more oil-soluble. Again there will be a limited range where the materials are useful for the practice of this invention.

In general, the compounds which would be selected for testing as to their suitability are oxyalkylated surfactants of the general formula $$Z[(OR)_nOH]_m$$

wherein Z is the oxyalkylatable material, R is the radical derived from the alkylene oxide which can be, for example, ethylene, propylene, butylene, epichlorohydrin and the like, $n$ is a number determined by the moles of alkylene oxide reacted, for example 1 to 2000 or more and $m$ is a whole number determined by the number of reactive oxyalkylatable groups. Where only one group is oxyalkylatable as in the case of a monofunctional phenol or alcohol R'OH, then $m=1$. Where Z is water, or a glycol, $m=2$. Where Z is glycerol, $m=3$, etc.

In certain cases, it is advantageous to react alkylene oxides with the oxyalkylatable material in a random fashion so as to form a random copolymer on the oxyalkylene chain, i.e. the $[(OR)_nOH]_m$ chain such as

—AABAAABBABABBABBA—

In addition, the alkylene oxides can be reacted in an alternate fashion to form block copolymers on the chain, for example —BBBAAABBBAAAABBBB— or

—BBBBAAACCCAAAABBBB— where A is the unit derived from one alkylene oxide, for example ethylene oxide, and B is the unit derived from a second alkylene oxide, for example propylene oxide, and C is the unit derived from a third alkylene oxide, for example, butylene oxide, etc. Thus, these compounds include terpolymers or higher copolymers polymerized randomly or in a block-wise fashion or many variations of sequential additions.

Thus, $(OR)_n$ in the above formula can be written —$A_aB_bC_c$— or any variation thereof, wherein $a$, $b$, and $c$ are 0 or a number provided that at least one of them is greater than 0.

It cannot be overemphasized that the nature of the oxyalkylatable starting material used in the preparation of the emulsifier is not critical. Any species of such material can be employed. By proper additions of alkylene oxides, this starting material can be rendered suitable as an emulsifier and its suitability can be evaluated by plotting the oxyalkyl content of said surfactant versus its performance, based on the ratio of the oil to water which can be satisfactorily incorporated into water as a stable emulsion. By means of such a testing system any oxyalkylated material can be evaluated and its proper oxyalkylation content determined.

As is quite evident new oxyalkylated materials will be constantly developed which could be useful herein. It is therefore not only impossible to attempt a comprehensive catalogue of such materials, but to attempt to describe the invention in its broader aspects in terms of specific chemical names would be too voluminous and unnecessary since one skilled in the art could by following the description herein select the proper emulsifier. This invention lies in the use of suitable oxyalkylated emulsifiers in preparing the emulsion systems of this invention and their individual composition is important only in the sense that their properties can effect the preparation and polymerization of these emulsions. To precisely define each specific oxyalkylated surfactant useful as an emulsifier in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduct with confidence the applicability of oxyalkylated emulsifiers suitable for this invention by means of the description set forth herein. In analogy to the case of a machine wherein the use of certain materials of construction or dimensions of parts would lead to no practical useful result, various materials will be rejected as inapplicable where others would be operative. One can obviously assume that no one will wish to make a useless composition or will be misled because it is possible to misapply the teachings of the present disclosure in order to do so. Thus, any oxyalkylated surfactant that can perform the function stated herein can be employed.

REPRESENTATIVE EXAMPLES OF Z

| No. | Z |
|---|---|
| 1 | $\overset{O}{\underset{\|}{RC}}-O-$ |
| 2 |  |
| 3 | R—O— |
| 4 | R—S— |
| 5 | $\overset{O}{\underset{\|}{R-C}}-\overset{H}{\underset{\|}{N}}-$ |
| 6 | $\overset{O}{\underset{\|}{R-C}}-N\overset{/}{\underset{\backslash}{}}$ |
| 7 | $\overset{H}{\underset{\|}{R-N}}-$ |
| 8 | $RN\overset{/}{\underset{\backslash}{}}$ |
| 9 | Phenol-aldehyde resins. |
| 10 | —O— (Ex: Alkylene oxide block polymers.) |

-continued
REPRESENTATIVE EXAMPLES OF Z

| No. | Z |
|---|---|
| 11 | 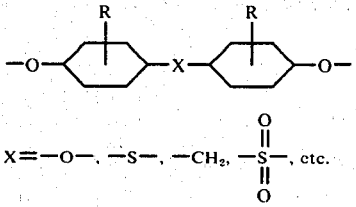 |
| 12 | 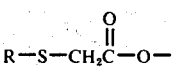 |
| 13 | RPO₄H— |
| 14 |  |
| 15 | PO₄≡ |
| 16 | 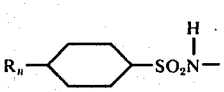 |
| 17 | 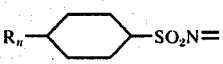 |
| 18 | 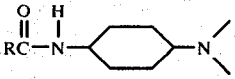 |
| 19 | Polyol-derived. (Ex: Glycerol, glucose, pentaerythritol.) |
| 20 | Anhydrohexitan or anhydrohexide derived. (Spans and Tweens.) |
| 21 | Polycarboxylic derived. |
| 22 | $(-\text{CHCH}_2-\text{O})_n$<br>$\quad\quad\mid$<br>$\quad\quad\text{CH}_2$<br>$\quad\quad\mid$<br>$\quad\quad\text{amine}$ |

Although any monomer heretofore polymerized by emulsion polymerization can be polymerized according to this invention, the preferred type of monomer(s) is one containing a vinyl group, i.e. a group of the formula

where the unsatisfied valences are hydrogen, hydrocarbon such as alkyl, aryl, cycloalkyl, heterocyclic, etc., halogen, group containing functional groups such as hydroxy, ester, acid, ketones, etc.

The following examples are presented for purposes of illustration and not of limitation.

EXAMPLE 1

An external phase comprising 11% of the emulsifier of Example 1, Column 7, of U.S. Pat. No. 3,352,109 (n-decanol + 1.96 PrO + 2.61 EtO, parts by weight); and 11% of the emulsifier of Example 20 of the same patent (crude phenol foots + 2.2 parts EtO by weight); ethylene glycol 20%; and water 58% was prepared. 10 milliliters of this external phase was introduced into a glass aerosol test flask. Liquid vinyl chloride monomer was added slowly to the flask under pressure. After each addition, the flask was shaken by hand until the mixture appeared homogenous. Incremental additions were continued until 90 milliliters of vinyl chloride had been added. 50 milliliters of the mixture in the flask was then transferred to a second essentially identical flask under pressure, and 50 milliliters more of vinyl chloride added incrementally with agitation. The two flasks were maintained at ambient room temperature exposed to daylight for a period of approximately 4 months. At the end of this time, the contents of each flask was a white friable solid.

EXAMPLE 2

A procedure similar to that described in Example 1 was followed except that the external phase was diluted with an equal amount of distilled water and varying amounts of di-(2-phenoxyethyl)-peroxydicarbonate was added as a catalyst. Emulsions were made with internal phase ratios of 20%, 50%, 70%, 90% and 95%. Polymerization was effected by immersing the flasks in a water bath at a temperature of 37° C. for a period of 48 hours, at the end of which time polymerization was essentially complete, as evidenced by the absence of free vinyl monomers. The molecular weight of these polymers was determined, and it was found that the molecular weight of materials in the high internal phase region was considerably higher than the molecular weight of the materials formed by polymerization occurring in the conventional polymerization region. This is illustrated in Table I infra.

EXAMPLE 3

High internal phase ratio emulsions of monomeric styrene-in-water were prepared following the procedure of Example 78 of U.S. Pat. No. 3,352,109. Benzoyl peroxide was used as a catalyst and polymerization was carried out at atmospheric pressure and temperature of 40° C. Emulsions with 80% and 90% internal phase polymerized to friable chalky solids.

EXAMPLE 4

In commercial application, the process of this invention may be carried out as follows. An apparatus essentially of the type described in Example 1 of U.S. Pat. No. 3,565,817, except that the mixing chamber is 8 inches in diameter and 12 inches in length and the pumps are scaled to allow a through-put in the 5 to 30 gallon per minute range, is equipped so that an appropriate aqueous external phase is metered in by one pump and the appropriate monomer proportioned in by another pump. The equipment is designed to operate at whatever pressure is required to maintain the monomer as a liquid. For example, in the case of vinyl chloride pressures above atmospheric pressure are maintained whereas when monomers such as styrene are employed atmospheric pressure can be employed.

The polymerization catalyst is incorporated into either the external phase or the internal phase just prior to its introduction into the emulsification chamber.

Using this apparatus, a high internal phase ratio emulsion of a polymerizable monomer or mixture of monomers containing a suitable polymerization catalyst is produced and emerges from exit piping of the mixing chamber at a rate determined by the pumping rates of the feed pumps. This polymerizable emulsion is then conducted through the piping system where it is maintained at the desired polymerization temperature for a period of time long enough so that polymerization is well advanced, but not to the point where the mixture becomes solid. When polymerization has progressed to the desired degree, the viscous partially polymerized emulsion is ejected into a larger chamber maintained at the appropriate temperature and pressure for the system. Here the polymerization proceeds to the solidification point of the emulsion and means are provided to tumble the solidified pieces of emulsion to prevent them from agglomerating into an intractable mass. The procedure here is essentially similar to that employed in the bulk polymerization of monomers. When the polymerization has proceeded to the desired point the chamber is vented, unreacted monomer is withdrawn from the chamber and recovered, and the chalky polymer chunks are subjected to various grinding procedures to reduce them to the desired particulate state. Where necessary, the aqueous external phase is then washed from the particles and the particles dried or further processed.

In Scanning Electron Microscopy the vacuum-dried bulk polymers were fractured and samples were mounted on copper discs prior to gold vacuum metallization. The metallized samples were examined utilizing a JEOLCO JSM-2 scanning electron microscope.

In order to characterize the polymers, intrinsic viscosity determinations and gel permeation chromatography in tetrahydrofuran were performed. The viscosity measurements were made using a No. 50 Cannon-Ubbelohde viscometer at 30° F. and a Waters ANA-PREP chromatograph was utilized to obtain molecular weight distribution data. Before measurements were made, the emulsified polymers were vacuum dried at 50°–60° C. and dissolved in tetrahydrofuran. The polymers were then precipitated in methanol, filtered, washed with methanol, dissolved in tetrahydrofuran and freeze dried. This procedure removed surfactant from the polymers which would interfere with the dilute solution measurements.

The ease of formation of the emulsions is dependent upon several parameters. The amount of monomer added incrementally is important. For example the addition of too much vinyl chloride causes the existing emulsion to break and to separate into two phases. Once phase separation had occurred, it was extremely difficult or impossible to re-establish the emulsion. The low water phase emulsions are very sensitive to the amount of catalyst present. It is difficult to form 90:10 and 95:5 emulsions at high catalyst concentrations. The catalyst apparently affects the relative solubility of the emulsifier in the two phases.

The high ratio emulsions formed rigid, friable polymer after about 8 hours reaction time. These polymers are chalky in appearance. The 70:30 and 50:50 emulsions are also chalky in appearance, but much more easily broken and crushed than the 90:10 and the 95:5. The 20:80 emulsions form suspensions of polymer. The rate of polymerizations is slower at low ratios than at high ratios of monomer:emulsifier. Polymerization carried out in emulsions containing 70% or more vinyl chloride are essentially quantitative.

Di-(2-Phenoxyethyl) peroxydicarbonate are chosen as the initiator because of its low half-life temperature. When more common initiators, such as benzoyl peroxide or AIBN* are employed, temperatures necessary for polymerization caused breaking of the emulsion.

*2,2'-azobis (isobutyronitrile)

A GPC trace of 95:5 (monomer:water) ratio polymer with a catalyst:monomer ratio of 6.66 mg/g was obtained. A major and a minor peak are evident and were typical of the chromatograms obtained. The minor peak of the bimodal distribution was more pronounced as the monomer:water ratio was increased; approximately 3% at 50:50 and increasing to 7% at 95:5. The peak molecular weight of the minor peak was always in the range of $1-2\times10^6$. The peak molecular weight of the major peak varied with the monomer:water ratio at a constant catalyst concentration as shown in Table I.

TABLE I

| Monomer:Water Ratio | Peak Molecular Weight (Major Peak) |
|---|---|
| 20:80 | 90,000 |
| 50:50 | 168,000 |
| 70:30 | 172,000 |
| 90:10 | 218,000 |
| 95:5 | 230,000 |

The molecular weight distribution (Mw/Mn) of the major peak was always in the range of 2.6–3.0. It was also found that the peak molecular weight decreased as the catalyst:monomer ratio increased for a constant monomer:water ratio. Preliminary evidence indicates that the minor high molecular weight peak is formed after the polymer has initially gelled and that the magnitude of the high molecular weight portion is a function of the catalyst:water ratio (catalyst/monomer × monomer/water) and the time the polymerization is allowed to continue past the gel point.

Intrinsic viscosity $[\eta]$ measurements were made on the series of polymers reported in TABLE I. These data are reported only as $[\eta]$. Because of the bimodal distributions, any attempt to calculate a viscosity average molecular weight by the Mark-Houwink-Sakurada relationship would not be completely meaningful. TABLE II shows the intrinsic viscosity and the Huggins constant as calculated from the Huggins and Kraemer equations.

TABLE II

| Monomer:Water Ratio | $[\eta]$, dl/g | k' | k'+k'' |
|---|---|---|---|
| 20:80 | 0.98 | 0.43 | 0.54 |
| 50:50 | 1.23 | 0.42 | 0.53 |
| 70:30 | 1.40 | 0.40 | 0.52 |
| 90:10 | 1.44 | 0.44 | 0.54 |
| 95:5 | 1.60 | 0.40 | 0.50 |

The values for k' reported here appear high for the molecular weight ranges under consideration. Rec evidence indicates that dissolution may not be complete using routine procedures and that long time periods are required to obtain acceptable scattering values at low angles less than 45°.

TABLE II shows how $[\eta]$ changes as a function of the monomer:water ratio at a constant catalyst:monomer ratio of 6.66 mg/g. TABLE III shows the change in $[\eta]$ as a function of catalyst:monomer ratio at a constant monomer:water ratio of 70:30. These results are typical of those obtained under other conditions. It is of interest to note that polymers having the same $[\eta]$ can be produced under different conditions; e.g., polymers having an $[\eta]$ of 1.58–1.60 can be produced using a monomer:water ratio of 95:5 and a catalyst:monomer ratio of 6.66 mg/g or a monomer:water ratio of 70:30 and a catalyst:monomer ratio of 3.33 mg/g.

TABLE III

| Catalyst: Monomer Ratio | [η], dl/g | k' | k'' |
|---|---|---|---|
| 8.57 | 1.28 | 0.41 | 0.51 |
| 6.66 | 1.40 | 0.40 | 0.52 |
| 4.95 | 1.43 | 0.42 | 0.52 |
| 3.33 | 1.58 | 0.40 | 0.52 |

To summarize briefly, the molecular weight of the major peak increases with a decrease in the amount of catalyst and increases with an increase in the internal ratio. The intensity of the secondary peak increases with an increase in phase.

Although oxyalkylates are the preferred emulsifiers, it should be understood that other emulsifiers besides oxyalkylates can also be employed provided such emulsifiers do not adversely effect polymerization.

I claim:

1. A process of emulsion polymerization which comprises forming a high internal phase ratio monomer-in-water emulsion of (1) an emulsion polymerizable monomer containing at least one $CH_2=C<$ group or an emulsion polymerizable mixture of monomers containing at least one $CH_2=C<$ group, (2) an emulsifying agent capable of forming a high internal phase ratio emulsion and (3) water, said monomer or said mixture of monomers being present in said high internal phase ratio monomer-in-water emulsion in an amount of at least 70% by volume of said emulsion, and treating said high internal phase ratio monomer-in-water emulsion under polymerization conditions so as to form the polymer, wherein said emulsifying agent is an oxyalkylated surfactant or a mixture of oxyalkylated surfactants.

2. The process of claim 1 where said oxyalkylated surfactant or said mixture of oxyalkylated surfactants is a polyoxyalkylene surfactant or a mixture of polyoxyalkylene surfactants, respectively.

3. The process of claim 2 where said monomer or one of said monomers in said mixture is selected from the group consisting of styrene, vinyl chloride, vinyl acetate and methyl methacrylate.

4. The process of emulsion polymerization which comprises forming a high internal phase ratio monomer-in-water emulsion of (1) an emulsion polymerizable monomer containing at least one $CH_2=C<$ group or an emulsion polymerizable mixture of monomers containing at least one $CH_2=C<$ group, (2) an emulsifying agent capable of forming a high internal phase ratio emulsion and (3) water, said monomer or said mixture of monomers being present in said high internal phase ratio monomer-in-water emulsion in an amount of at least 80% by volume of said emulsion, and treating said high internal phase ratio monomer-in-water emulsion under polymerization conditions so as to form the polymer, where said emulsifying agent is an oxyalkylated surfactant or a mixture of oxyalkylated surfactants.

5. The process of claim 4 where said oxyalkylated surfactant or said mixture of oxyalkylated surfactants is a polyoxyalkylene surfactant or a mixture of polyoxyalkylene surfactants, respectively.

6. The process of claim 5 where said monomer or one of said monomers in said mixture is selected from the group consisting of styrene, vinyl chloride, vinyl acetate and methyl methacrylate.

7. The process of claim 4 where said monomer or said mixture of monomers is present in said high internal phase ratio monomer-in-water emulsion in an amount of at least 85% by volume of said emulsion.

8. The process of claim 7 where said oxyalkylated surfactant or said mixture of oxyalkylated surfactants is a polyoxyalkylene surfactant or a mixture of polyoxyalkylene surfactants, respectively.

9. The process of claim 8 where said monomer or one of said monomers in said mixture is selected from the group consisting of styrene, vinyl chloride, vinyl acetate and methyl methacrylate.

10. The process of claim 3 wherein said monomer is vinyl chloride.

11. The process of claim 6 wherein said monomer is vinyl chloride.

12. The process of claim 9 wherein said monomer is vinyl chloride.

13. The process of claim 6 wherein said monomer is styrene.

14. The polymer formed by the process of claim 10, said polymer being rigid and friable and in the shape of hollow spheres capable of being crushed to extremely fine powdered particles of the size of about 1 micron to about 5 microns, said polymer exhibiting a bimodal molecular weight distribution and having (1) a major peak molecular weight distribution (mw/Mn) in the range of about 2.6–3.0, said major peak molecular weight being from about 172,000 to about 230,000, and a minor peak of molecular weight of $1-2 \times 10^6$ and (2) an intrinsic viscosity of from about 1.40 dl/g to about 1.60 dl/g, said intrinsic viscosity determination and said molecular weight determination being made in tetrahydrofuran with a No. 50 Cannon-Ubbelohde viscometer at 30° F. and a Waters ANA-PREP chromatograph, respectively.

* * * * *